(12) United States Patent
Amanze (10) Patent No.: US 9,302,386 B1
(45) Date of Patent: Apr. 5, 2016

(54) SUPPORT FIXTURE (71) Applicant: Charles U Amanze, West Bloomfield, MI (US)

(72) Inventor: Charles U Amanze, West Bloomfield, MI (US)

( * ) Notice: Subject to any disclaimer, the term of this patent is extended or adjusted under 35 U.S.C. 154(b) by 0 days.

(21) Appl. No.: 14/530,431

(22) Filed: Oct. 31, 2014

(51) Int. Cl.
| | | |
|---|---|---|
| *A47G 23/02* | (2006.01) | |
| *B25H 1/00* | (2006.01) | |
| *A46B 17/02* | (2006.01) | |
| *F16M 11/16* | (2006.01) | |
| *F16M 11/18* | (2006.01) | |
| *F16M 11/22* | (2006.01) | |

(52) U.S. Cl.
CPC .............. *B25H 1/0042* (2013.01); *A46B 17/02* (2013.01); *F16M 11/16* (2013.01); *F16M 11/18* (2013.01); *F16M 11/22* (2013.01)

(58) Field of Classification Search
CPC ......... A02D 7/00; F16M 11/06; F16M 11/04; F16M 11/041; F16M 2200/00; B62H 1/0042; A46B 17/02
USPC ...................... 248/150, 125.7, 133, 136, 165; 172/371, 372; 56/400.14, 400.19
See application file for complete search history.

(56) References Cited

U.S. PATENT DOCUMENTS

| | | | | |
|---|---|---|---|---|
| 5,413,329 A | * | 5/1995 | Hirsch ................... | A63B 55/10 211/70.2 |
| 6,955,609 B1 | * | 10/2005 | Hiltner, Jr. ............. | A63B 55/10 116/173 |
| 8,714,497 B2 | * | 5/2014 | Bricker .................. | B25B 11/00 172/371 |
| 2008/0135696 A1 | * | 6/2008 | LeMay ................. | B25H 3/006 248/170 |
| 2012/0137548 A1 | * | 6/2012 | Kimball ................... | A01B 1/02 37/266 |

* cited by examiner

*Primary Examiner* — Todd M Epps (57) ABSTRACT

A support fixture that can be securely attached to a work implement such as floor mops, dust mops, push brushes, long handled paint rollers, shovels, garden rakes, leaf rakes, squeegees, long handled trowels, vacuum cleaner wands, walking sticks, long handled shears and other long handled tools, includes a mounting bracket and a standing leg. The standing leg is hingedly engaged into the mounting bracket. The support fixture is light in weight and substantially aids the work implement to stand alone uprightly and in a stable position when the work implement is not operational. When the work implement is operational, the standing leg may be adjustably flipped upwards to prevent any obstruction of the operations of the work implement.

4 Claims, 7 Drawing Sheets

FIG. 7

SUPPORT FIXTURE

BACKGROUND OF THE INVENTION

1. Technical Field

The present invention relates generally to supports, and more particularly, to stably and uprightly support work implements that have long handles.

2. Background of Related Arts

A continuing problem that presents itself to users of floor mops, dust mops, push brushes, long handled paint rollers, shovels, garden rakes, leaf rakes, squeegees, long handled trowels, long handled shears, vacuum cleaner wands, walking sticks, or other items with long handles (hereinafter called work implement) is the inability or difficulty to stand them uprightly when the user is temporarily, and sometimes completely finished using the work implement. In such situation, the work implement will be leaned against a wall, tree or any stronger and more stable structure. When such wall, tree or stronger and more stable structure is not in close proximity such as in large gymnasiums, lawns, gardens and conference halls, the user will have no choice but place the work implement on the floor or ground. The floor or ground may be wet or dirty or full of leaves or debris. If the work implement is placed on a ground full of leaves, the user may not recognize the location when they return to resume using the work implement. Also, the user or passerby may accidently step on it or trip, causing damage or serious injuries.

Moreover, when the work implement is placed on the floor or ground, upon resumption of use, the user will be required to bend down to pick it. The process of bending down and picking up a work implement may be impossible or physically challenging to some people and cause or exacerbate existing back ache to others.

Thus far, the most common solution to the aforementioned problem has been cumbersome attachments which do not allow the work implement to be used efficiently, especially in tight spaces such as where floors meet wall corners. Hence, a more complete and satisfactory solution is still sought by many.

The disadvantages associated with the most common solutions to the aforementioned problems have made it apparent that a new technique for uprightly and stably standing work implements is needed. The new technique should be light in weight, easily adaptable and foldable or retractable when the work implement is in use, and most importantly, stand the work implement uprightly and stably when the work implement is not in use. The present invention is directed to this ends.

SUMMARY OF THE INVENTION

It is therefore an object of the present invention to provide an improved and reliable support fixture which attaches securely to a work implement. Another object of the present invention is to stand a work implement uprightly and stably. Additionally, the new technique is light in weight, capable of being adjustably flipped to prevent any obstruction during the use of the work implement.

In accordance with the object of the present invention, a support fixture is provided. The support fixture includes a mounting bracket and a standing leg. The mounting bracket attaches the support fixture to a work implement. The standing leg is hingedly connected to the mounting bracket and extends downwards to engage with the floor, ground or support surface.

The support fixture can be built as an integral part of a work implement by the manufacturer of the implement.

The present invention thus achieves an improved fixture to stand work implements. The present invention is advantageous in that it uprightly stands and stably maintains the position of the work implement.

Additional advantage and features of the present invention will become apparent from the description that follows, and may be realized by the instrumentalities and combinations particularly pointed out in the appended claims, taken in conjunction with the accompanying drawings.

BRIEF DESCRIPTION OF THE DRAWINGS

In the following figures, the same reference numerals, alphabets and alphanumerals will be used to identify components in the various views. The present invention is illustrated with respect to a support fixture, particularly suited for household, signs, educational, janitorial and industrial fields. The present invention is also adaptable to various other uses that may require uprightly and stably standing long items, in which.

DETAILED DESCRIPTION OF THE PREFERRED EMBODIMENT(S)

Figure 1A:
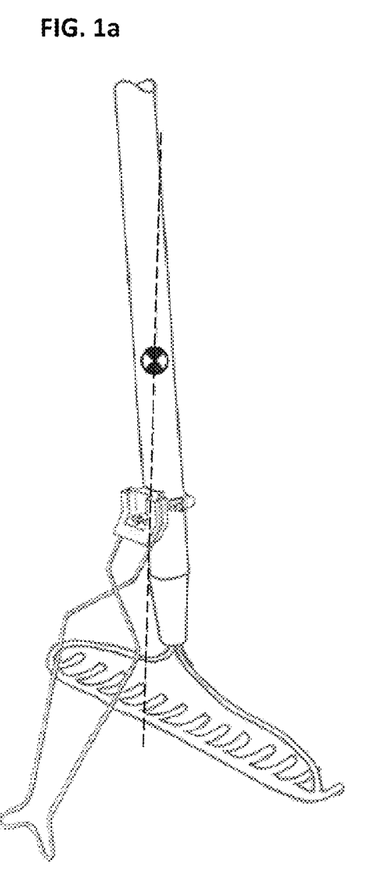
FIG. 1a is a perceptive view of a clamp type mounting bracket embodiment of the support fixture when it is aiding a garden rake to remain upright and stable, without references pointing at its components.
Figure 1B:
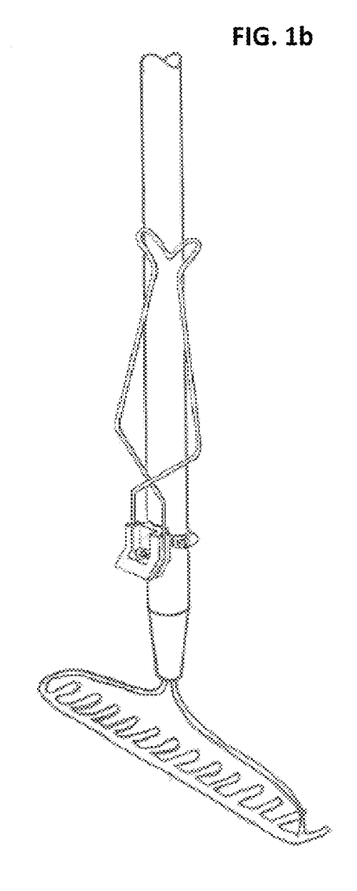
FIG. 1b is a perceptive view of the same clamp type mounting bracket embodiment of FIG. 1a in a folded position, whereby, allowing the garden rake to be in an operational state, without references pointing at its components.
Figure 2A:
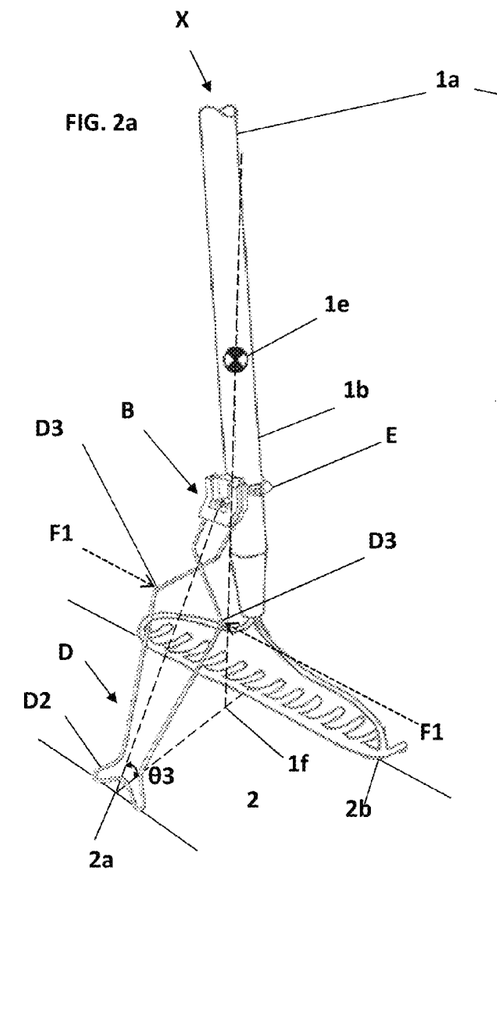
FIG. 2a is a perceptive view of a clamp type mounting bracket embodiment of the support fixture when it is aiding a garden rake to remain upright and stable.
Figure 2B:
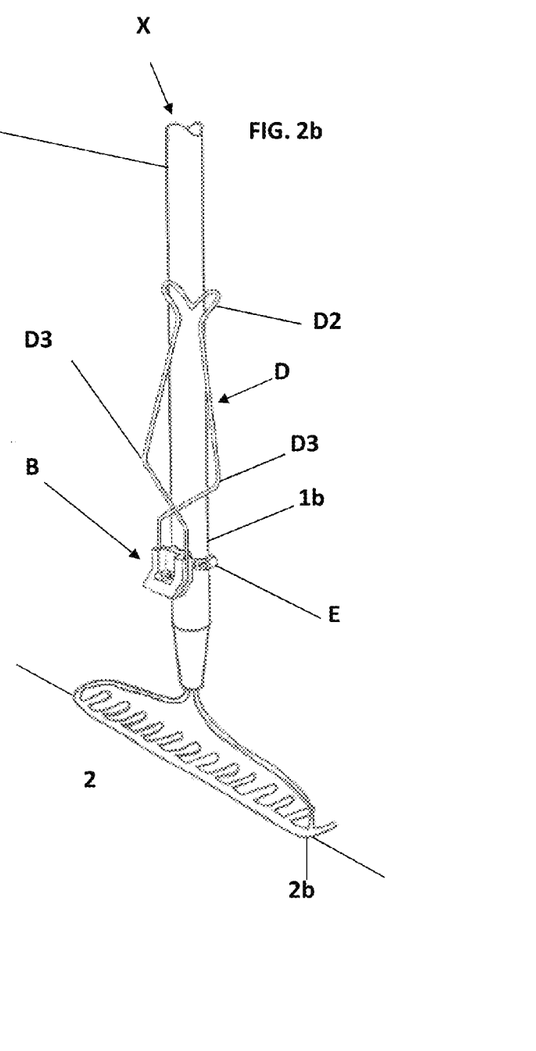
FIG. 2b is a perceptive view of the same clamp type mounting bracket embodiment of FIG. 2a when the standing leg is in a folded position, whereby, allowing the garden rake to be in an operational state.

Referring now to the figures, a conventional garden rake work implement X is shown in FIGS. 1a, 1b, 2a and 2b. FIGS. 1a and 2a show the work implement standing uprightly and stably with the aid of the present invention. In FIGS. 1b and 2b, the present invention is folded to allow the work implement to be operational.

The conventional garden rake work implement X includes a long handle with a circular cross section. The cross sectional handle has an upper portion 1a and a lower portion 1b. The support fixture is securely attached to the lower portion 1b of the rake's handle.

The support fixture assembly includes a mounting bracket generally indicated as A, B and C and a standing leg generally indicated as D. Specifically, the snap type mounting bracket is indicated as A in FIG. 4. The clamp type mounting bracket is indicated as B in FIGS. 2a, 2b, 5a and 5b, and the screw type mounting bracket is indicated as C in FIGS. 6 and 7.

The standing leg D includes a top section with end tips D1 and a bottom section D2. The end tips D1 are hingedly attached to the mounting bracket B. The bottom section D2 rests on a floor, ground or support surface 2 at contact points generally indicated as 2a.

In FIG. 2a, the standing leg D is operatively adjusted downwards to stand the work implement X, when the work implement X is not operational. However, some users may prefer to operate the work implement X when the standing leg D is in the downward position.

Further in FIG. 2a, the work implement X is engaged with the floor, ground or support surface 2 at contacts points generally indicated as 2b. The center of gravity 1e of the work implement X lies vertically within the point 1f where the standing leg D is engaged with the floor, ground or support surface 2a and the point where the work implement X is engaged with the floor, ground or support surface 2b.

In FIG. 2b, the standing leg D is operatively adjusted upwards. In the upward position, the bottom section D2 tightly rests on the handle 1b of the work implement X and makes the work implement X ready for use. The upward and downward operative adjustments of the standing leg D are achieved by the user applies equal, opposite and simultaneous forces F1 at points generally indicated as D3, then, operatively adjusts the standing leg D accordingly, and finally, releases the forces F1.

Figures 3A, 3B:
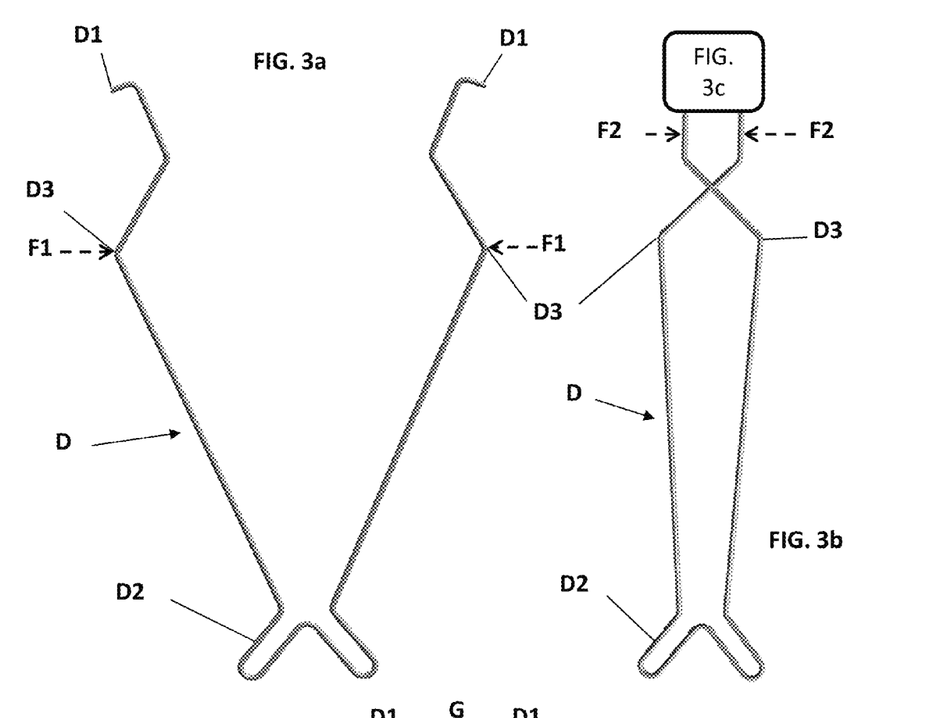
FIG. 3a is a front view of the standing leg of the present invention before it is hingedly inserted into the mounting bracket.
FIG. 3b is a front view of the standing leg of the present invention after it is hingedly inserted onto the mounting bracket.
Figure 3C:
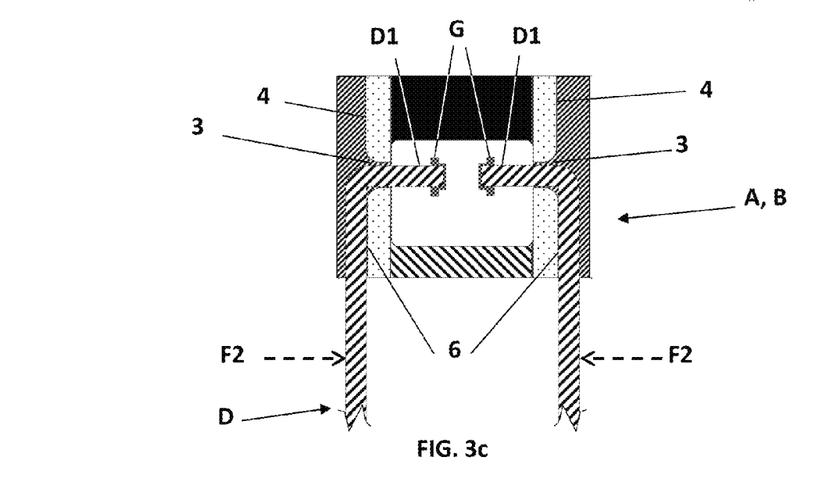
FIG. 3c is a sectional view of the top section of the snap and clamp type mounting brackets after the standing leg is hingedly inserted onto the mounting bracket.

Referring to FIGS. 3a, 3b and 3c, the standing leg D is a long rod configured into multiple symmetrical shapes along its length. The FIGS. reveal the long rod deliberately sharped to achieve a plurality of performance characteristics, such as:
  (a) End tips D1 are insert able into through holes 3 of the mounting bracket A, B, C to form a hinge.
  (b) After the end tips D1 are inserted into through holes 3, standing leg D produces enough forces F2 to clamp onto walls 4 or walls 6 of the mounting bracket A, B, C.
  (c) The standing leg D is configured to have a plurality of extended bottom tips D2 which increases the stability of the work implement X during engagement with the floor, ground or support surface 2.

Further, FIG. 3a shows the standing leg D before it is hingedly engaged with the mounting bracket A, B, C and FIGS. 3b and 3c show after the standing leg D is hingedly engaged with the mounting bracket A, B. Although, the sectional view of the screw type mounting bracket C is not shown, the position, attributes and functionality of the standing leg D is the same when it is hingedly engaged with all the mounting brackets A, B and C.

In the present invention, the standing leg D is made using stainless hard drawn spring steel rod. Other materials that exhibit the same physical properties can be used to achieve the same result. The standing leg D is of spring steel material in that when two equal and simultaneous forces F1 pointing at each other are applied at points indicated as D3, and then released, the standing leg D will return to its original free standing shape as in FIG. 3a.

In order to prevent the standing leg D from disengaging from through holes 3 during the application of forces F1, the end tips D1 are crimped or an item attached to them. In the present invention, push nuts G for unthreaded shafts are attached to secure the end tips D1.

Figure 4:
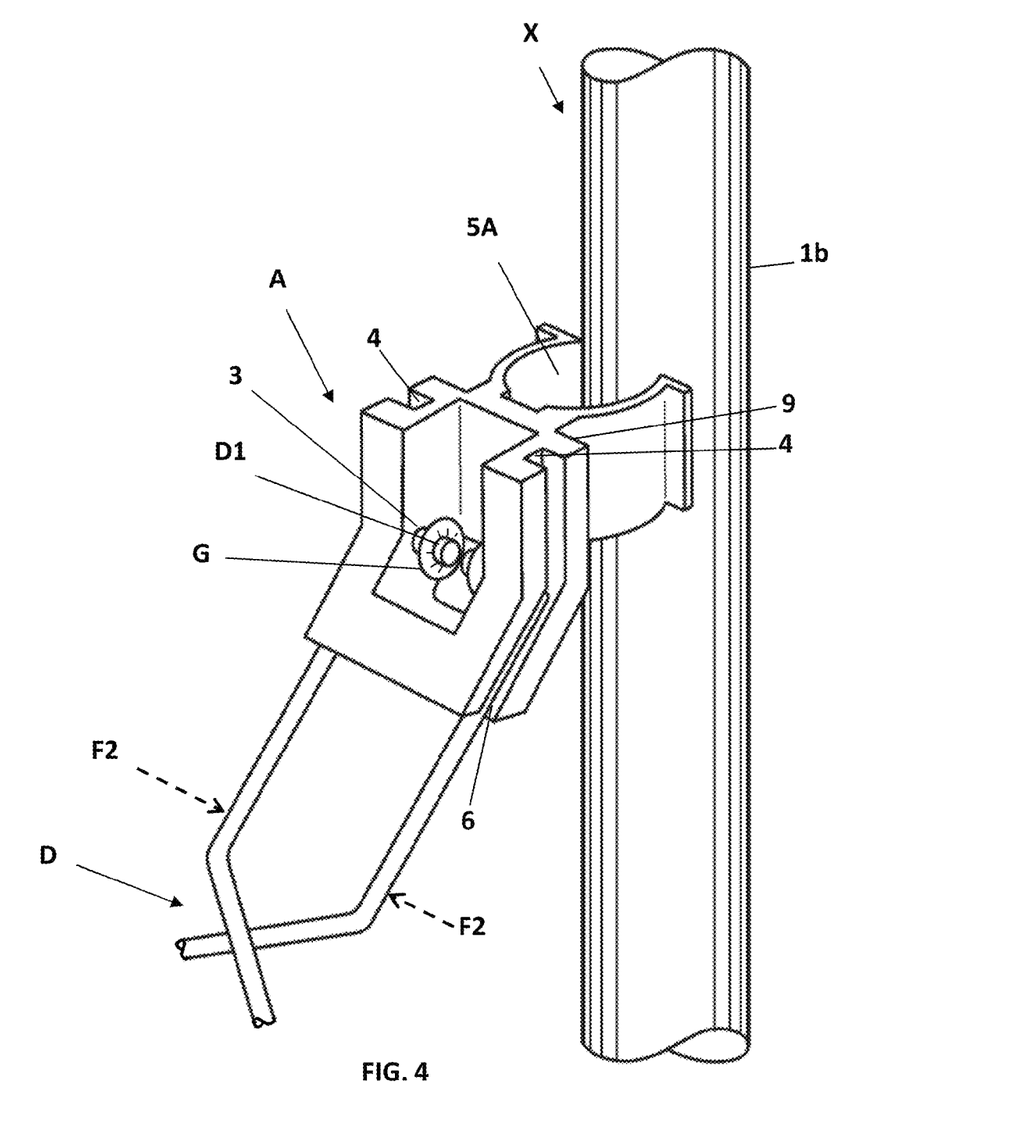
FIG. 4 is a perceptive view of the snap type mounting bracket embodiment of the support fixture.

FIG. 4 illustrates a first embodiment of the mounting brackets A, B, C, in which, the mounting bracket A is a snap type. The snap type mounting bracket A has cavity 5A to receive the lower portion or handle 1b of the work implement X. Size and shape of the cavity 5A are configured to easily accept and tightly grip the handle 1b.

Figures 5A, 5B:
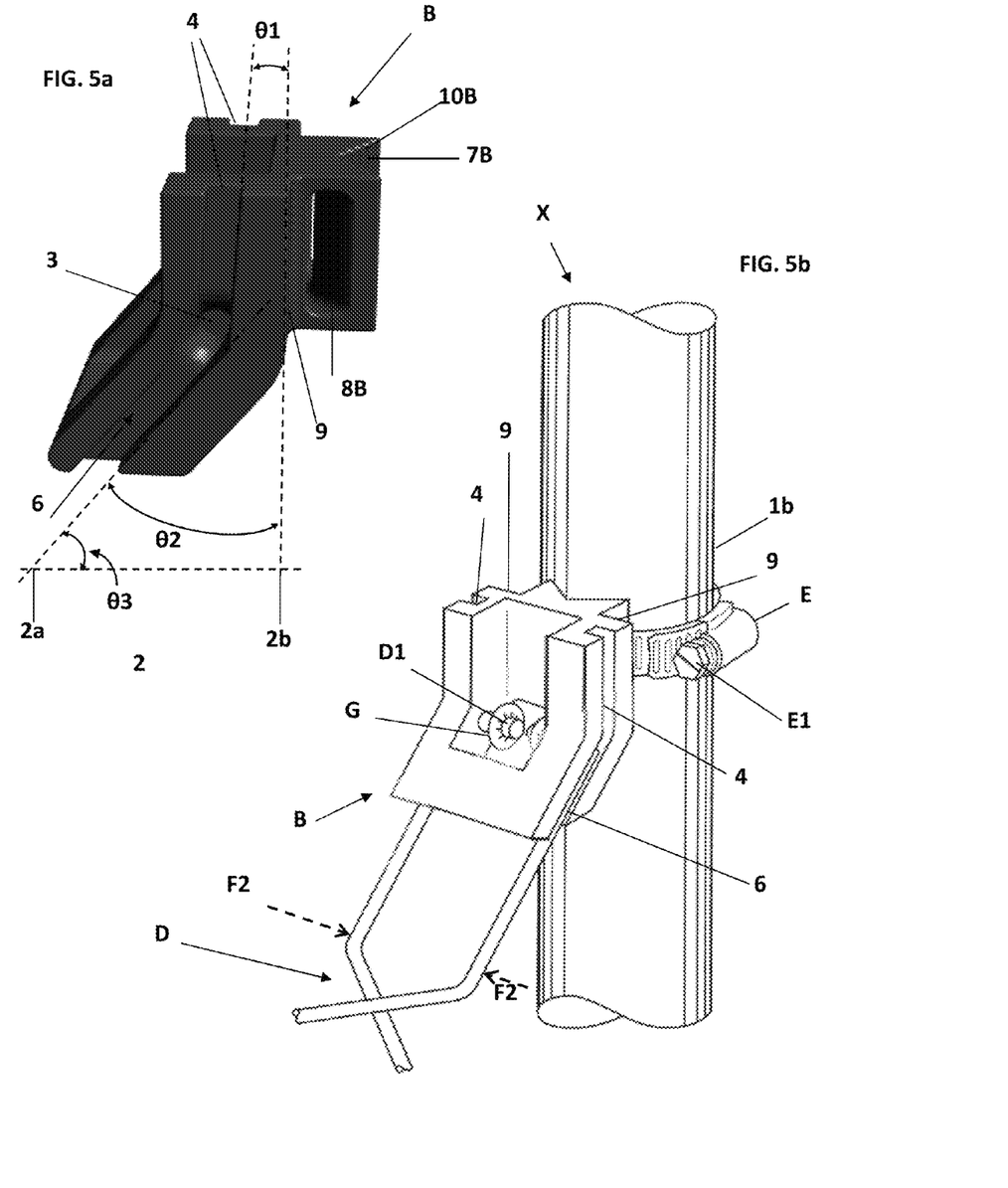
FIG. 5a is a perceptive view of the clamp type mounting bracket embodiment of the support fixture without the clamp.
FIG. 5b is a perceptive view of the clamp type mounting bracket embodiment of the support fixture when it is attached to a circular handle with a clamp.

FIG. 5a reveals some essential components of the clamp type mounting bracket B. Cavity 7B is shaped in "V" form. Cavity 7B is configured to accept different types and sizes of implement handles 1b. Vertical grooves 10B are carved along the surface of the cavity 7B to allow the mounting bracket B to grip more tightly as a clamp E is fastened.

FIG. 5a is used to further illustrate additional advantages of the present invention. Top slots 4 are constructed to maintain an acute angle θ1 relative to vertical sides 9. The acute angle θ1 enables the standing leg D to rest tightly on the handle 1b of the work implement X when the implement is operational. Top slots 4 coincide with and it is also perpendicular with through holes 3. When the standing leg D is operatively adjusted downwards, it clamps onto the walls of bottom slots 6. Bottom slots 6 coincide with and it is also perpendicular with through holes 3. Bottom slots 6 are a continuation of top slots 4. Bottom slots 6 are at an acute angle θ2 relative to vertical sides 9. The acute angle θ2 enables the standing leg D to maintain a stable stance with the work implement X.

In FIG. 5b, a clamp E is shown and it is used to securedly attach the clamp type mounting bracket B onto the handle 1b. The clamp E slides into one end of a flat hole generally indicated as 8B. Upon emerging from the other side of the flat hole 8B, the clamp E is engaged and adjustably tightened with clamp screw E1 to firmly grip the clamp type mounting bracket B onto the handle 1b.

While the work implement X is shown and described to be attached with support fixture having the snap type A or clamp type B mounting brackets, those having ordinary skill in the art will appreciate that attaching the support fixture can be achieved using other methods. Thus, it will be understood that the present invention is not limited to attachment using only the snap type mounting bracket A or the clamp type mounting bracket B.

Figure 6:
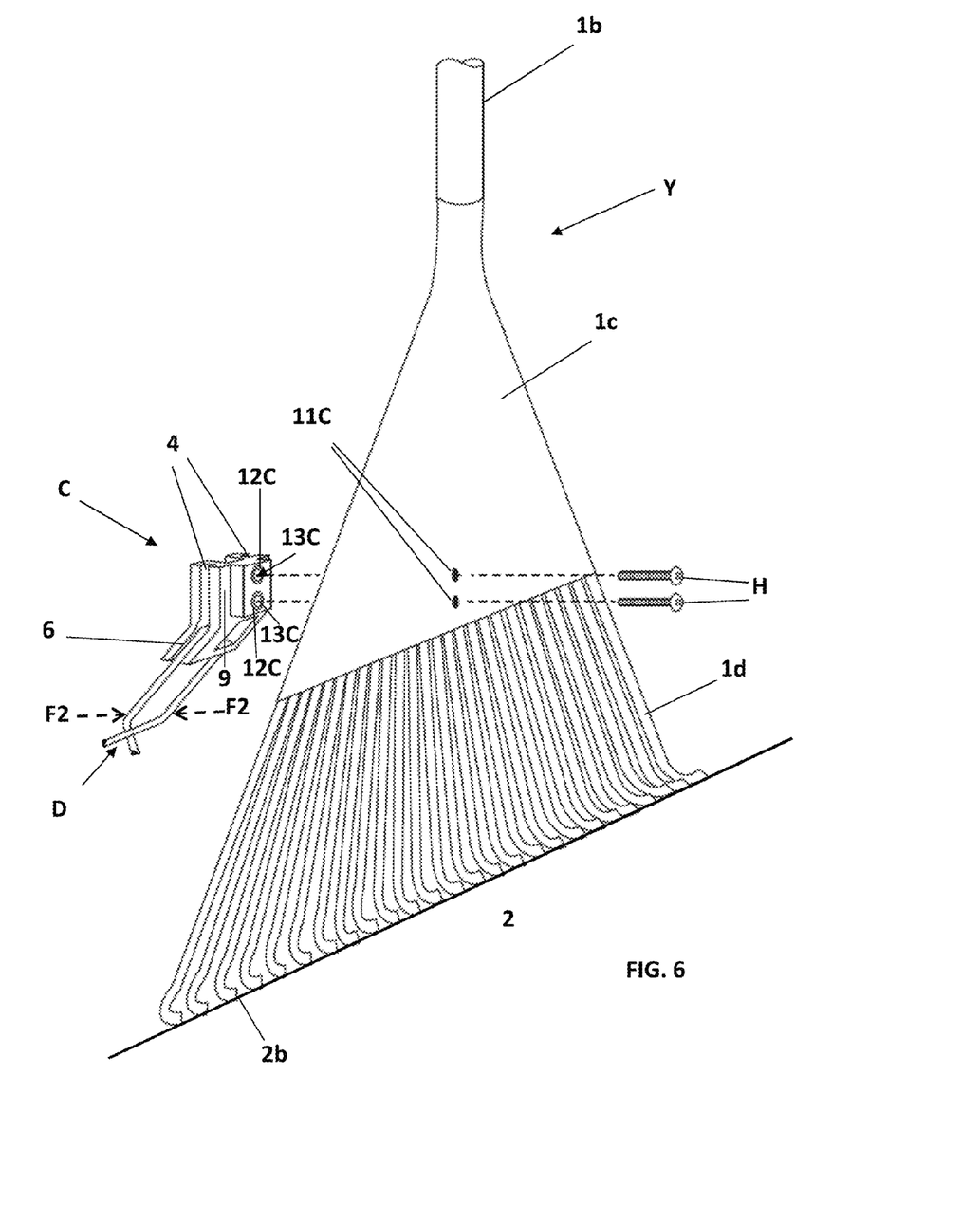
FIG. 6 is a perceptive view of a screw type mounting bracket embodiment of the support fixture showing how it is assembled onto the frame of a leaf rake.

As an example, in FIG. 6, another embodiment of the support fixture is shown using conventional screws H for mounting, hereinafter called the screw type mounting bracket C. The screw type mounting bracket C is adequately designed for work implements with frames 1c, such as leaf rakes Y. FIG. 6 also shows a leaf rake Y with tall flexible prongs 1d extending from its frame 1c. The screw type mounting bracket C is secured at the center of the frame 1c along its vertical axis as indicated by frame holes 11C. A plurality of mounting holes 13C is located at the center of the screw type mounting bracket C. Threaded insert 12C forms an integral part of the mounting holes 13C. The mounting screws H are inserted in frame holes 11C from the front side of the leaf rake Y. The mounting screws H engage onto threaded inserts 12C and are operatively tightened. Engagement of the mounting screws H and operatively tightening same firmly secures the screw type mounting bracket C on the frame 1c of the leaf rake Y.

While the support fixture assembly illustrated thus far are shown in connection with conventional rakes, those having ordinary skill in the art will appreciate that the support fixture may be employed to other tools and items, such as long handled paint rollers, shovels, leaf rakes, squeegees, long handled trowels, vacuum cleaner wands, walking sticks and long handled shears. Thus, it will be understood that the present invention is not limited for use solely in connection with tool implements with long handles, but for use in all applications where stable upright standing are required.

Figure 7:
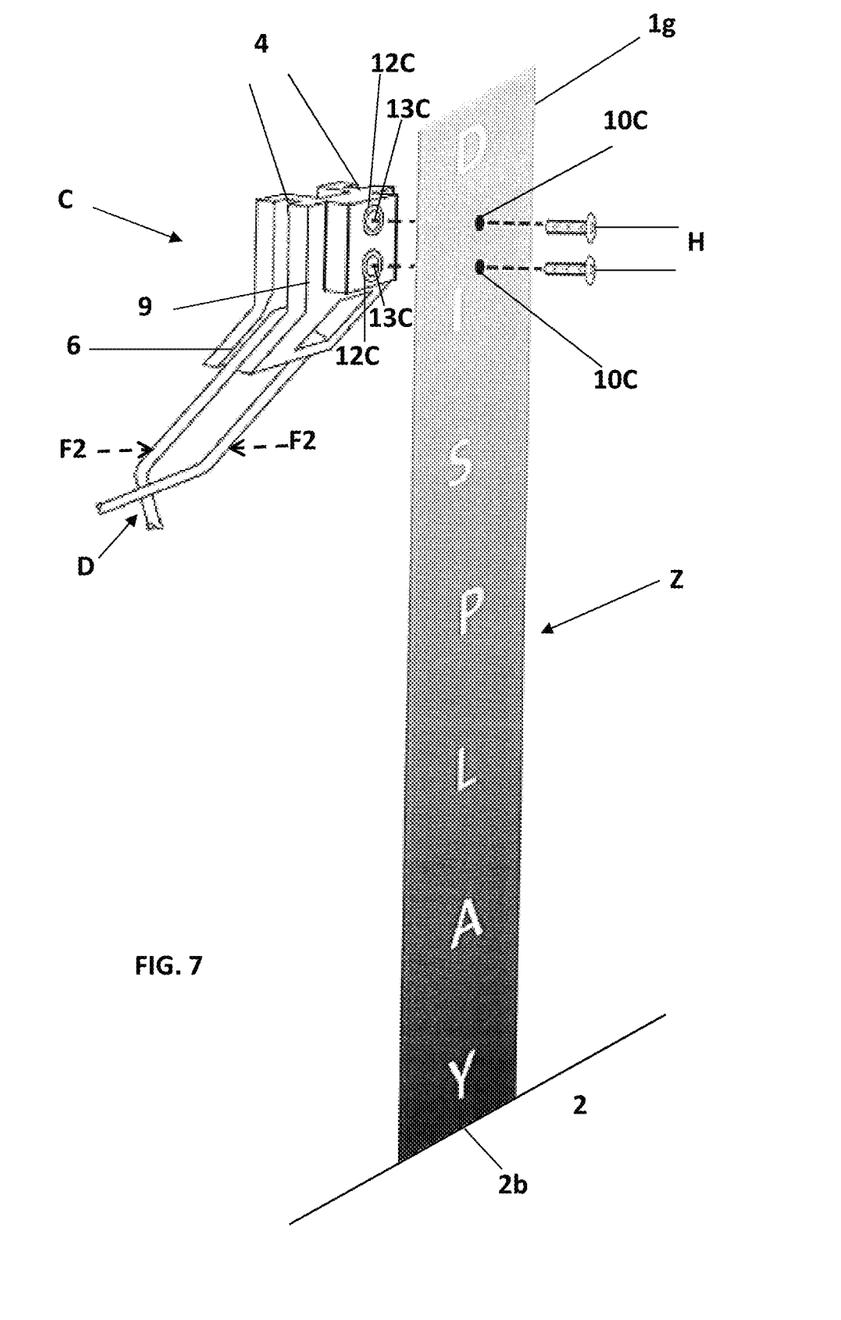
FIG. 7 is a perceptive view of the screw type mounting bracket embodiment of the support fixture showing how it is assembled onto a display board.

Another example where the screw type mounting bracket C can be used is shown in FIG. 7. Mounting screws H is inserted into mounting holes 10C on frame 1g of a board Z. Using a conventional screw driver (not shown), the mounting screws H are operatively fastened into threaded insert 12C. The operation fastens the screw type mounting bracket C onto the board Z.

All of the aforementioned mounting brackets A, B, C are preferably made with lightweight materials such as aluminum or plastic-casts.

What is claimed is:

1. A support fixture in combination with a work implement (X, Y, Z) to uprightly and stably stand said work implement (X, Y, Z), and said support fixture comprising,
   (a) a mounting bracket (A, B, C) securely attached to a handle (1b) of said work implement (X, Y, Z), said work implement (X, Y, Z) having a center of gravity (1e);
   (b) a standing leg (D) symmetrically configured and shaped along its length, said standing leg (D) having a to section with end tips (D1), said end tips (D1) are hingedly attached to said mounting bracket (A, B, C), and a bottom section (D2) for engagement with a floor, ground or support surface (2);
   (c) a plurality of end caps (G) securely attached to said end tips (D1) to prevent said standing leg (D) from disengagement from said mounting bracket (A, B, C);

said standing leg (D) is operatively and frictionally flipped upwards when said work implement (X, Y, Z) is operational, and said standing leg (D) is operatively and frictionally flipped downwards when said work implement (X, Y, Z) is not operational; and, both the standing leg (D) and the work implement (X, Y, Z) are engaged on said floor, ground or support surface (2), and said standing leg (D) remains at an acute angle (θ3) relative to said floor, ground or support surface (2) such that the center of gravity (1e) of said work implement (X, Y, Z) lies between point (1f) where the work implement (X, Y, Z) is engaged with the floor, ground or support surface (2b) and where the standing leg (D) is engaged with the floor, ground or support surface (2a).

2. A support fixture as set forth in claim 1 wherein said mounting bracket (A) includes a snap cavity (5A) for securing said mounting bracket (A) onto said handle (1b) of said work implement (X, Y, Z), said snap cavity (5A) is configured to easily accepts and tightly grips said handle (1b).

3. A support fixture as set forth in claim 1 wherein, said mounting bracket (B) includes a flat hole (8B) and a clamp (E);

said clamp (E) has a clamp screw (E1);

said clamp (E) is inserted into said flat hole (8B) and wraps around said handle (1b); and, said clamp screw (E1) is operatively tightened to securely attach said mounting bracket (B) onto said handle (1b).

4. A support fixture as set forth in claim 1 wherein said mounting bracket (C) includes a plurality of conventional screws (H), wherein said screws (H) are inserted into predefined holes on said work implements (Y, Z) and said screws (H) are operatively fastened onto threaded insert (12C) to securely attach said mounting bracket (C) onto frame (1c, 1g) of said work implement (Y, Z); and, said threaded insert (12C) forms an integral part of said mounting holes (13C).

* * * * *